United States Patent [19]
Patel et al.

[11] Patent Number: 6,000,435
[45] Date of Patent: Dec. 14, 1999

[54] REINFORCED HOSE AND RETAINER RING ASSEMBLY

[75] Inventors: Jayant D. Patel, Lake Forest; Clifford J. Petersen, Irvine; Ronald J. Talamantez, Fountain Valley; Oliver D. Murray, Riverside, all of Calif.

[73] Assignee: McDonnell Douglas Corporation, St. Louis, Mo.

[21] Appl. No.: 08/995,849

[22] Filed: Dec. 22, 1997

[51] Int. Cl.⁶ .............................. F16L 9/16; F16L 33/20
[52] U.S. Cl. ............................................. 138/122; 138/109
[58] Field of Search ................................... 138/122, 103, 138/109; 285/110, 21, 146.1; 228/212; 156/195, 429; 264/137; 392/472

[56] References Cited

U.S. PATENT DOCUMENTS

| | | | |
|---|---|---|---|
| 4,196,840 | 4/1980 | McClure | 228/212 |
| 4,335,753 | 6/1982 | Frye | 138/109 |
| 4,364,418 | 12/1982 | Genini et al. | 138/103 |
| 4,852,914 | 8/1989 | Lyall | 285/21 |
| 4,997,503 | 3/1991 | Bohannan et al. | 156/195 |
| 5,191,916 | 3/1993 | Kanao | 138/122 |
| 5,340,167 | 8/1994 | Morse | 285/243 |
| 5,388,870 | 2/1995 | Barthomew | 285/242 |
| 5,415,436 | 5/1995 | Claes et al. | 285/110 |
| 5,573,038 | 11/1996 | Kanao | 138/122 |
| 5,622,394 | 4/1997 | Soles et al. | 285/256 |

*Primary Examiner*—Andres Kashnikow
*Assistant Examiner*—Davis Hwu
*Attorney, Agent, or Firm*—Westerlund & Powell; Robert A. Westerlund; Raymond H.J. Powell, Jr.

[57] ABSTRACT

The present invention is directed to a new and improved flexible hose assembly for transmitting pressurized air, gases and/or fluids between two spaced apart components. The hose assembly includes an inner liner surrounded by a helix formed of thermoplastic material having a substantially flat surface portion for bonding with the inner liner, eliminating the need for a outer cord to prevent the helix from floating relative to the liner. A self-adjusting retainer ring serves to compress the flexible hose onto the beaded end portion of a component with increasing pressure as the pressure increases within the hose assembly. Preferably the retainer ring is formed from a single piece of thermoplastic material.

9 Claims, 5 Drawing Sheets

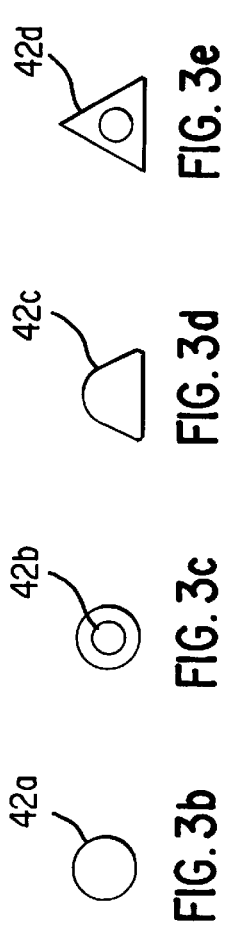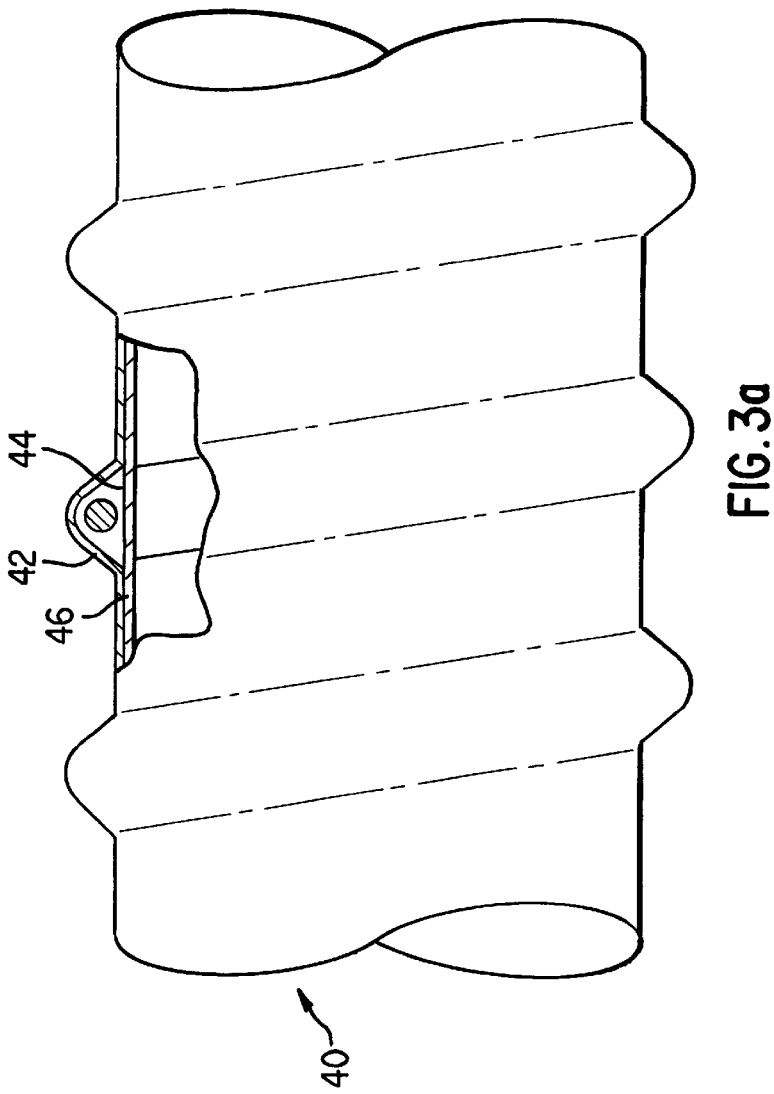

REINFORCED HOSE AND RETAINER RING ASSEMBLY

BACKGROUND OF THE INVENTION

The present invention relates generally to a flexible duct or hose assembly utilized for transferring pressurized air or other gases or even fluids in aerospace and commercial applications. In particular, the present invention is directed to flexible hose assembly having greatly improved bonding strength and resulting stiffness, significant cost and weight savings while, at the same time, demonstrating better performance due to higher strength and pressure capability as compared to conventional flexible hose assemblies. The improved hose assembly has a wider and higher range of operating temperatures and pressures with enhanced protection against leaks and burns.

Currently, conventional ducts or hoses consist of some variation of the standard three-part assembly. A round helix is bonded to the external or internal surface of an internal liner and the helix is, itself, surrounded by an external reinforcing cord. This assembly allows the hose to sustain pressure loads while providing the flexibility needed to compensate for misalignment between component members. The external, protective cord is designed to prevent movement of the helix, which would otherwise result in delamination of the internal liner. In such a hose assembly, the external reinforcing cord may be formed of fiberglass, nylon, polyester or even cotton. The internal liner may be formed of silicone, neoprene, nitriles, vinyls, fluorosilicones, butyls or any well known rubber product. Finally, the helix is usually formed of spring steel wire or nylon (polyamide).

When forming a conventional, round helix or steel wire or nylon, costly processing steps, coatings and chemical treatments are necessary to achieve a satisfactory bond with the internal liner. Because of the difficulty in achieving such a bond, the external fiberglass cord often must be applied on both sides of the helix to prevent air pockets from being developed between the helix and the liner. The external cord is also necessary to prevent the helix from floating within the hose assembly due to inadequate bonding as well as to apply pressure during curing process. If the outer cord is not properly applied, the helix still may be free to move, resulting in delamination of the internal liner and ultimate failure of the hose assembly. Such failure may result in ballooning, rupture or internal blockage of the gas or fluid being transmitted through the hose assembly. The outer cord adds significant weight to the hose as well as increasing the overall cost of manufacturing the hose. A further drawback of conventional flexible hose assemblies resides in the use of nylon to form the helix. While nylon cannot be employed in applications in excess of 200 degrees F, it is currently acceptable for use in limited high temperature applications.

Conventional aircraft hoses extend between and are attached to component structures, i.e., pressure tanks, wall ports, hose outlets, by sliding the flexible ends of the hose's internal liner over beaded, protruding, round, oval, or similarly shaped extensions formed on the component structures. A band clamp, similar to those employed on automobile hoses, is manually positioned to surround both the beaded end of the component and overlapping portion of the liner before being tightened. Alternatively, when joining the beaded ends of two separate components to form a continuous hose assembly, a flexible sleeve is usually employed to overlap the beaded end portions. A separate band clamp is disposed to encircle each of the beaded end portions as well as the overlapping end portions of the sleeve. Each of the band clamps is systematically tightened, usually by turning a screw, to form a leak proof passageway between the sleeve and the components.

Conventional band clamps must be periodically inspected and adjusted to assure that the fluid tight connection is maintained between the hose and component or between two hoses connected by an overlapping sleeve. Such inspection and maintenance is expensive and labor intensive in the need for periodically retightening and repositioning the band clamps. The metallic band clamps are heavy and not very reliable. Overtightening or improper alignment of a band clamp can cause damage to the component joined to the hose and/or possible tearing of the flexible sleeve when employed in hose-to-hose connections. Destruction of the component or sleeve by over-torquing can lead to pressure loss throughout the flexible hose assembly. This, in turn, can readily lead to component failure and passenger discomfort, if the hose at high altitude for delivering oxygen to within an aircraft. Frequently, sleeves extending between and overlapping the end portions of the separate hoses will leak around one or both of the band clamps due to mating surface irregularity/deformation. The standard response to any resulting air and fluid leaks is additional tightening of the clamp which can easily lead to over-torquing the band clamp. Alternatively, the relatively expensive process of employing fillers, reinforcements or weldments is employed to reduce leaks between the hose and component.

In an effort to overcome the problems associated with conventional metallic band clamps, U.S. Pat. No. 5,622,394 suggests that a metal ferrule be permanently, mechanically crimped onto the hose. There is no ability to alter the engagement pressure between the ferrule and the hose and if excessive pressure is applied to the ferrule, the result will be the same as over-torquing a clamp band. Additionally, replacing a damaged duct will normally require expensive removal application methods and tools for removing the crimped ferrule. In many areas the crimped ferrule is impossible to remove due to its inaccessibility.

Another proposed solution to the band clamp problem is shown in U.S. Pat. No. 5,388,870 wherein differences in the biconical shapes of the mating members provides a clamping force for maintaining the hose in place. Such an assembly could not be employed with standard beaded conduit members as routinely found in the aerospace field.

A yet further attempt to overcome the problems associated with conventional band clamps is found in the assembly taught in U.S. Pat. No. 5,340,167 which employs a heat shrinkable tubing clamp. This assembly cannot be easily mounted by hand and, more importantly, there is no self-adjustment capability once the clamp is deployed into its final location. This system is not applicable to the aircraft and automobile industries because it doe not meet FM regulations for burn resistance requirements and exposure to heat will continue to shrink and break. This system also does not sustain pressure loading.

Based on the above and foregoing, it can readily be appreciated that there presently exits a need in the art for a flexible hose assembly which overcomes the weight, cost and production problems associated with known flexible hose assemblies. There also exists a need for overcoming the bonding problems between the helix and the internal liner as well as a need for constructing a flexible hose assembly capable of operating at high temperatures and pressures. Finally, there is a need for a band clamp which can be easily applied, preferably self-adjustable, automatically provides additional clamp-up with increased pressure and is not capable of over-torquing.

As will become apparent hereinafter, the present invention fulfills these needs by providing a hose assembly employing a uniquely formed helix capable of increased bonding with the internal liner which eliminates the need for any separate reinforcement cord. The materials utilized in constructing the helix are carefully chosen to assure operation at a wide range of temperatures and pressures. A retainer ring constructed in accordance with the present invention can be easily positioned about the hose and component or sleeve by merely sliding the retainer ring. Once in position, the retainer ring engages the beaded end portion of the component to form a self-adjusting fluid tight connection that automatically increases in strength as the load on the hose increases. This creates a positive seal that is leak-proof and capable of withstanding variations in pressure and temperature without need for any additional application of torque by the operator as required with conventional band clamp assemblies.

SUMMARY OF THE INVENTION

The present invention encompasses a duct or hose assembly including a helix constructed of unique thermoplastic materials such as polyetherimides, polyphenylsulfone, or polyarylsulfones the helix is completely bonded to the outer surface of the internal liner without the need for subsequent coating, etching, and reinforcement cords as required with conventional hose assemblies. The thermoplastic material provides superior physical and mechanical properties as well as exhibiting excellent adhesion properties.

The helix is preferably extruded in continuous, random lengths before coiled. The helix can be hollow or solid and of either round, half-round, triangular or similar cross-section. The portion of the helix which surrounds and is bonded to the internal liner may be textured during the formation cycle to further enhance the strength of the bond. An embossed roller or wrapping roller with a textured tape cloth may be employed for applying the textured surface to the extruded helix. The coiled helix is capable of providing uniform pitch as it is coiled about the internal liner during lay-up without inducing stress into the helix.

The unique cross-section of the helix significantly increase the helix bonding surface which comes into contact with the internal liner. In particular, a helix with either a triangular or half-rounded cross-section tends to reduce and even eliminate air pockets from forming between the helix and the internal liner. It is this feature that eliminates the need for a separate fiberglass reinforcing cord or cover to surround the helix.

In some instances it may be desirable to stiffen a portion or all of the hose assembly. Hardened portions of the hose can be achieved by incorporating polyester or epoxy coated fiberglass reinforcements during the fabrication cycle. The hardened portions of the hose assembly can receive aligned orifices/holes and eyelets as required for fluid distribution. The hardened outer surface of the hose assembly is also useful in providing a rigid section to receive clamping member and to sustain clamping pressures which arise during connection of the hose assembly to a component or to a further hose by means of a connecting sleeve.

Flexible hoses constructed in accordance with the present invention can be used in positive and negative pressures, in high or low temperature applications, to transfer hot or cold fluids ranging from −65° to plus 500° F. This makes such hose assemblies of particular use in outerspace vehicles, commercial, military and marine aircraft, all types of ground vehicles, trains and ships as well as in the building and construction trades and a variety of other commercial fields.

The present invention further encompasses a unique retainer ring which replaces the conventional band clamp in securing a flexible hose assembly to a component or to a flexible sleeve extending between two separate flexible hoses. The retainer ring is initially positioned by hand to encircle both the beaded end of the component and a portion of the inner liner overlapping the beaded end portion. The inner surface of the retainer ring engaging the hose provides anti-slip resistance to keep the hose from separating from the component. The separation force exerted on the hose by the pressure of the air, gas or liquid flowing through the hose causes the hose and the retainer ring to slide until confronting the beaded end portion of the component. When the retainer ring presses against the beaded end it applies a compressive force that serves to lock the hose tightly against the beaded end, thereby preventing any further movement of the hose. The locking pressure of the retainer ring compresses the flexible hose against the component creating a positive seal that increases as the load increases. In effect, the retainer ring self-adjusts to the change in load without the need to manually apply additional torque.

In a similar manner, the retainer ring can be applied to retain a sleeve in fluid tight engagement with the beaded end portions of two separate flexible hoses. In particular, after the sleeve is positioned to surround the beaded end portions of the two hoses, a separate retainer ring is manually positioned to partially encircle each beaded end portion as well as the overlapping end portions of the sleeve. As gas or fluid is pumped through the hose assembly, the pressurized gas causes the retainer rings to compress the sleeve into ever-tighter engagement with the beaded end portions. This creates a self-locking seal that tends to apply increasing pressure between the sleeve and the beaded end portions in response to an increase in pressure in the hose assembly.

BRIEF DESCRIPTION OF THE DRAWINGS

The above and other objects, features, and advantages of the present invention will become apparent from the following detailed description taken in conjunction with the accompanying drawings, in which:

FIGS. 2b, 2c and 2d show cross-sectional, top and side views of the band clamp shown in FIG. 2a;

FIG. 3a shows a schematic representation of a hose assembly formed in accordance with the present invention;

FIGS. 3b, 3c, 3d and 3e show cross-sectional views of different helix members each formed in accordance with the present invention;

FIG. 4b show a perspective view of the retainer ring utilized in the embodiment of FIG. 4a.

DETAILED DESCRIPTION OF THE INVENTION

While the present invention is described herein with reference to illustrative embodiments for particular applications, it should be understood that the invention is not limited thereto. Those having ordinary skill in the are and access to the teachings provided herein will recognize additional modifications, applications, and embodiments within the scope thereof and additional fields in which the present invention would be of significant utility.

Figure 1A:
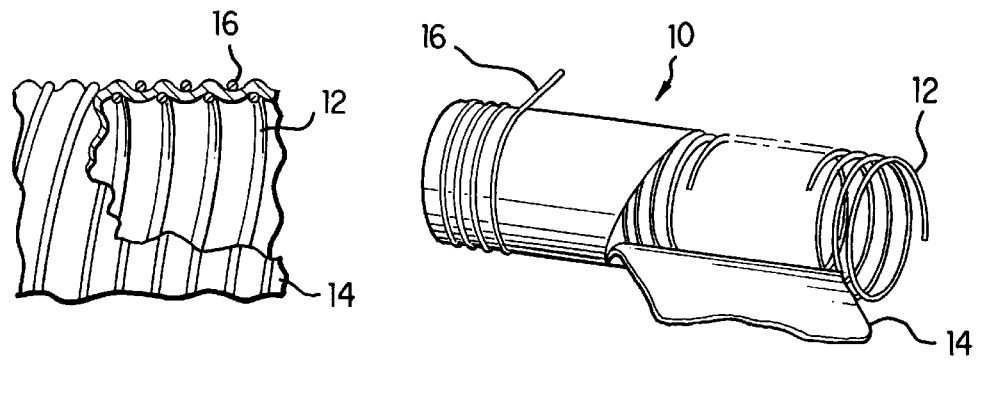
FIG. 1a shows a schematic representation of a conventional single ply hose assembly.

With reference now to FIG. 1a, there can be seen a schematic representation of a conventional single ply hose assembly 10. The hose or duct assembly 10 usually consists of a round helix 12 which is either internal as shown in FIG. 1a or external. Surrounding helix 12 is a cover 14 formed of rubber or possibly impregnated fiberglass. The cover 14 forms a fluid passageway that can sustain pressure loads as well as provide sufficient flexibility to bend into various shapes as needed to compensate for misalignment between components, not shown. To prevent flotation of helix 12 along the length of the hose 10 and eventual delamination of cover 14, a cord 16 usually formed of fiberglass material is wrapped about cover 14 and helix 12. When assembled, hose assembly 10 is capable of transferring air or other pressurized gases for use in both aerospace and commercial applications.

Figure 1B:
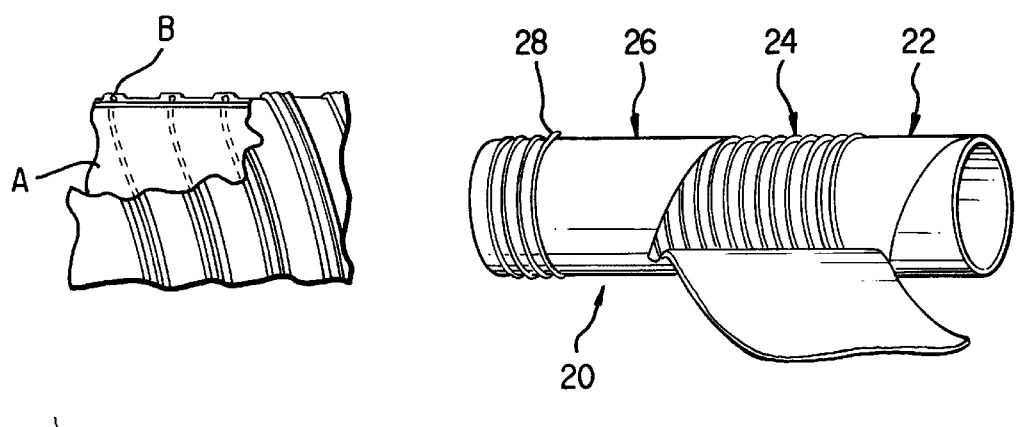
FIG. 1b shows a schematic representation of a conventional double ply hose assembly.

A further, conventional double ply hose assembly is shown in FIG. 1b at 20. Such an assembly usually includes an internal liner 22 surrounded by a wire helix 24 formed of spring steel or nylon. A cover 26, similar to cover 14 in the singly ply embodiment of FIG. 1a surrounds helix 24. Cover 26 may be formed of rubber or impregnated fiberglass. To prevent flotation of helix 24, and outer cord 28 of fiberglass material is usually wrapped about cover 26 and helix 24.

Figure 1D:
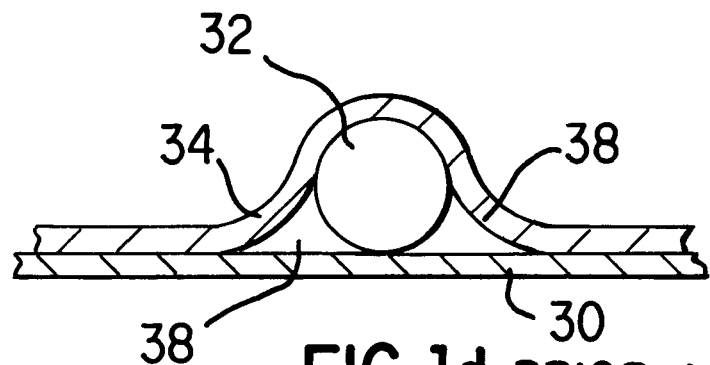
FIG. 1d is a blow-up of a portion of the of conventional hose assembly of FIG. 1c showing the air pocket between components.
Figure 1C:
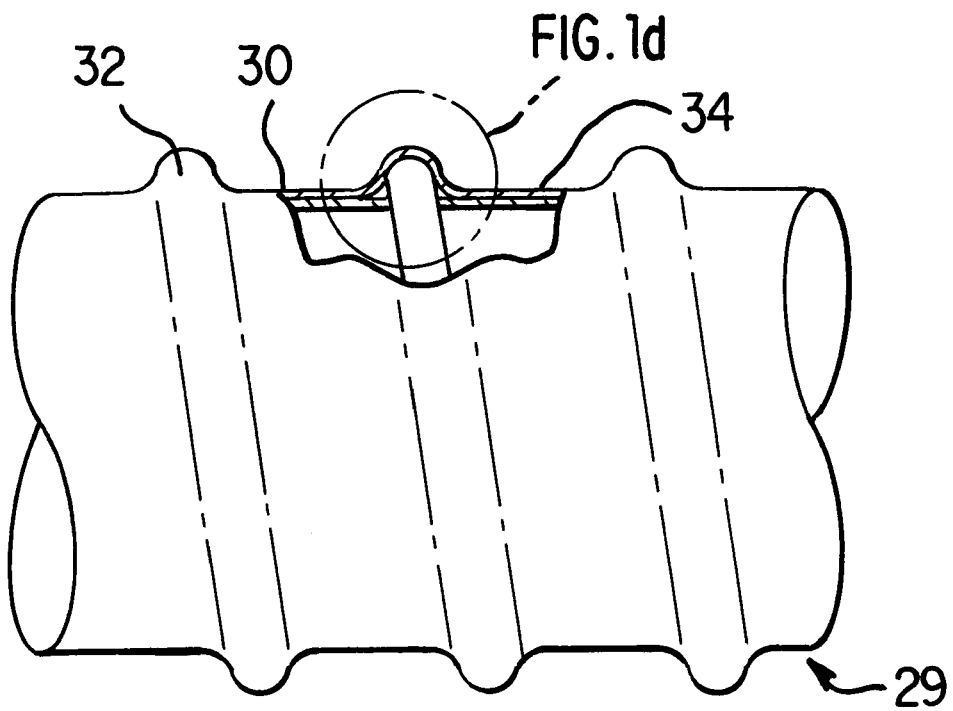
FIG. 1c shows a schematic representation of a conventional flexible hose assembly showing three separate components.

For purposes of explanation, a further, conventional hose assembly 28 is shown in FIGS. 1c and 1d, respectively. In this conventional arrangement, an internal liner 30 is surrounded by a conventional spring wire or nylon helix 32 which, itself, is wrapped in an outer ply 34 usually formed of elastomerically coated fiberglass. As can be more readily seen in FIG. 1d, air pockets 38 are formed between the confronting spaced surfaces of liner 30, helix 32 and outer ply 34. Such air pockets 38 reduce the bonding strength between helix 32 and liner 30. This, in turn, allows helix 32 to float relative to liner 30, resulting in delamination of the internal liner 30 and, ultimately, failure of hose 29. If any portion of hose 29 fails, there can be ballooning, rupture or internal blockage of the air, gas or fluid being transmitted through the hose assembly.

In order to overcome the problems affecting conventional hose assemblies 10, 20 and 29, the present invention provides a uniquely constructed hose assembly shown at 40 including a helix 42 as shown in FIG. 3a. To avoid material failure of helix 42, it is preferably formed of thermoplastic material such as polyetherimide, polyphenlsulfone or polyarylsulfone capable of complete bonding without subsequent coating, etching or reinforcement steps required when using spring or nylon helix members.

Helix 42 is preferably extruded in continuous random lengths before being coiled. Helix 42 may have a solid, circular cross-section 42a or be formed with a hollow circular cross-section 42b. To maximize the bonding surface of helix 42, it may be formed with a solid, triangular cross-section 42c or a hollow, triangular cross-section 42d. It would be within the scope of the present invention to form helix 42 with a half-round cross-section or an other similar shape that maximizes the bonding surface.

As shown in FIG. 3a, the hose assembly 40 formed in accordance with the present invention includes an internal liner 46 surrounded by helix 42. Because of increased bonding surface of helix 42, there is no need for an outer cord as required in conventional hose assemblies. As shown in FIG. 3a, helix 42 makes surface contact 44 with liner 46, eliminating air pockets from being formed. To even further improve the bonding strength the thermoplastic material used to form helix 42 can be textured during the extrusion cycle. Texturing is preferably accomplished by use of an embossed roller or wrapping roller with a textured tape or cloth. The coiled helix material will provide uniform pitch during lay-up operation without introducing stresses. By careful manufacturing it is possible for the diameter and pitch of the helix material to provide optimum performance at elevated pressures.

While the preferred embodiment of hose assembly 40 eliminates the need for an outer cord, there may be requirements to harden portions of hose assembly 40 in order to install orifices/holes and eyelets as required for air or fluid distribution. This is preferably achieved by incorporating polyester or epoxy coated fiberglass reinforcements into hose 40 during fabrication. These hardened sections also prove useful to bear clamping forces as well as forces encountered during installation and/or loading.

Figure 2A:
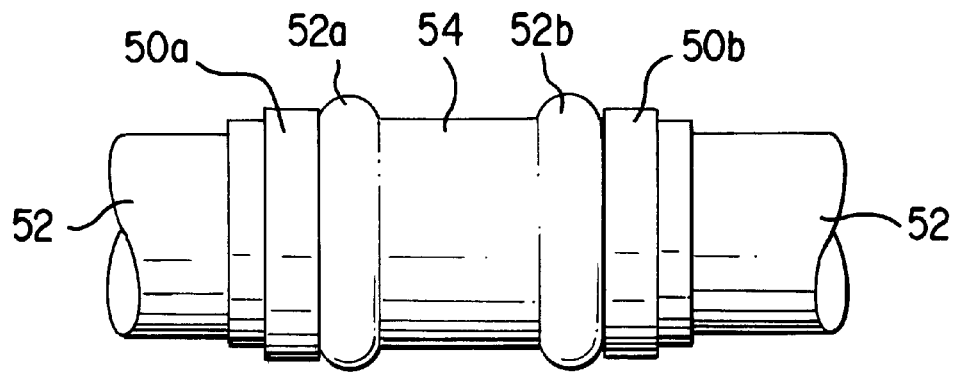
FIG. 2a shows a schematic representation of a pair of conventional band clamp assemblies mounted on either end of a sleeve which itself surrounds the end portions of a pair of flexible hose members.
Figure 2C:
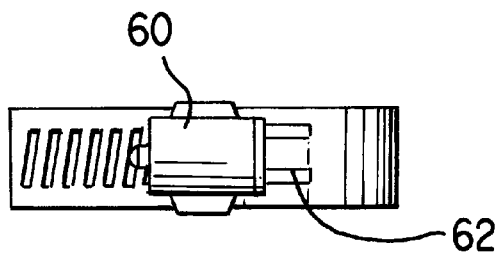
Figure 2D:
Figure 2B:
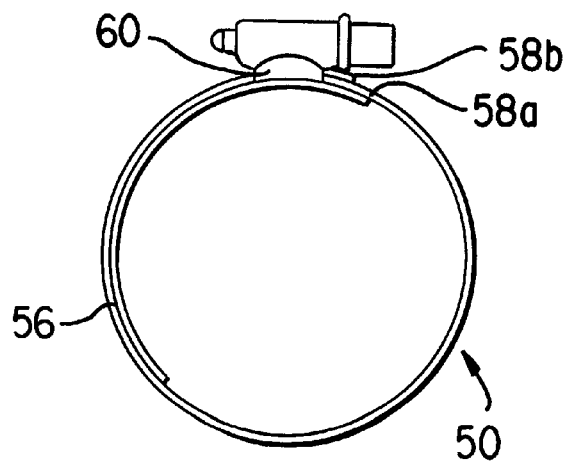

A further problem facing existing hose assemblies resides in the inability to easily attach one end of a hose to a component or to a confronting end of a further hose assembly. Conventional band clamps 50a and 50b are shown in FIG. 2a abutting beaded ends 52a and 52b of confronting hose members 52 as well as surrounding end portions of a sleeve 54 overlapping each of the hose end portions 52a and 52b. Band clamps 50a and 50b serve to press sleeve 54 into sealing contact with the beaded end portions to prevent leaks from forming between sleeve 54 and either of the attached hoses 52. A conventional band clamp 50 is shown in FIGS. 2b–2d as being a hoop having a circular cross-section 56, with overlapping end portions 58a and 58b. A housing 60 is mounted on the band with a torque screw 62 serving to tighten band clamp 50 in a conventional manner. If band clamp 50 is over tightened, or put at an improper angle, pressure exerted by band clamp 50 can damage the component, not shown, or tearing of sleeve 54. This, in turn, can lead to significant pressure loss and eventual failure of the hose assembly.

Figure 4B:
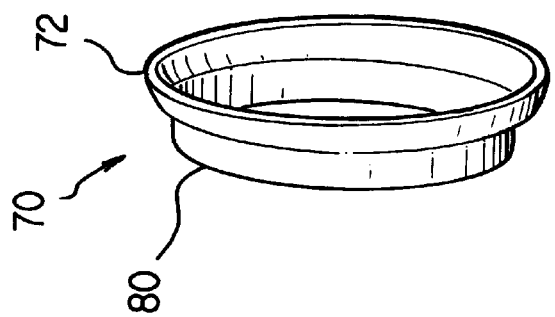
Figure 4A:
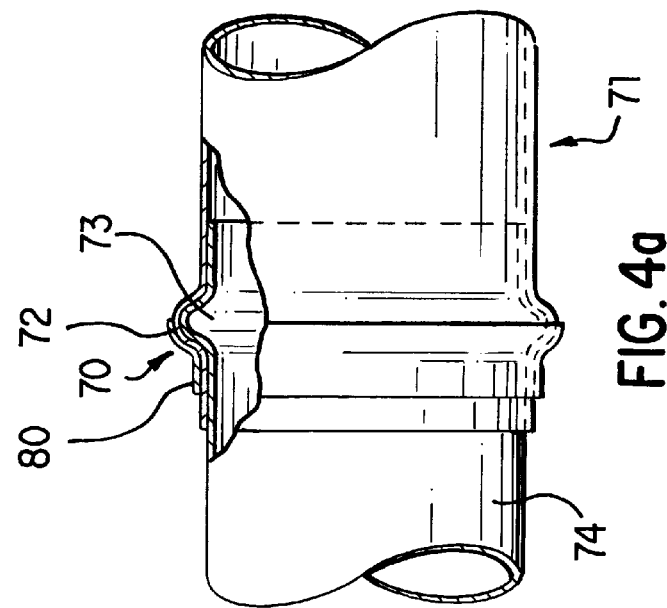
FIG. 4a shows a schematic view of a retainer ring mounted on a flexible hose assembly in accordance with the present invention.

A retainer ring 70 formed in accordance with the present invention and shown in FIGS. 4a and 4b overcomes the installation and maintenance problems facing conventional band clamp 50 maximizing the effectiveness of the fluid-tight connection formed between a hose assembly 71, whether or not formed in accordance with the present invention, and a beaded end portion 73 of a component 74. Retainer ring 70 is preferably of one-piece construction and is formed of (thermoplastic or metallic material. Retainer ring 70 includes a raised, curved end portion 72 forming substantially one quarter (¼) of a sphere and adaptable for partially encircling both the beaded end portion 73 of component 74 as well as overlapping end of hose 71. Preferably, the curved end portion 72 covers substantially one half (½) of the beaded end portion 73 as well an overlapping portion of hose 71. Retainer ring 70 further includes an opposite end portion 80 of substantially cylindrical configuration which contacts the outer surface of hose 71.

During assembly, hose 71 is positioned to overlap the beaded end portion 73 of the component 74. Retainer ring 70 is then manually slid along the outer surface of hose 71 until it passes over beaded end portion 73. The geometry of retainer ring 70 provides anti-slip resistance to hose 71, preventing it from detaching from the beaded end 73 of component 74. Pressurized gas or fluid introduced into hose 71 generates a detaching force causing hose 71 and retainer ring 70 to separate from component 74 until curved portion 72 of retainer ring 70 makes contact with the beaded end portion 73 of component 74. Additional detachment force then acts to squeeze retainer ring 70 and lock hose 71 against beaded end 73, thereby providing a positive seal between component 74 and hose 71. As the pressure of the gas or fluid flowing through the sealed connection, i.e., the load, increases, the engagement pressure maintaining the seal also increases. In effect, retainer ring 70 provides a self-adjusting, pressure seal that increases in direct response to an increase in load in hose 71.

The present invention provides an improved hose assembly incorporating a helix formed of thermoplastic material having triangular or flat based cross-sections that provide significantly wider surfaces for bonding to an inner liner. Because the cross-section is significantly wider there is more bonding area per given length of helix. The improved bond eliminates the need for additional treatments to the helix material. In addition, the specific shapes chosen enhance the performance of the helix by enabling the hose assembly to bear higher pressures due to the increased stiffness of the helix. The present invention further provides an innovative retainer ring assembly that is self-adjusting without the need to torque the ring into engagement with a hose as previously required. Both the hose assembly and the retainer ring are preferably formed of non-metallic thermoplastic materials that can be easily shaped without the need for special treatments.

In general, although a preferred embodiment of the present invention has been described in detail hereinabove, it should be clearly understood that many variations and/or modifications of the basic inventive concepts herein taught which may appear to those skilled in the pertinent art will still fall within the spirit and scope of the present invention, as defined in the appended claims.

What is claimed is:

1. A self-adjusting retainer ring for joining a flexible hose to a component or to a further flexible hose, comprising:

a substantially ring-shaped member having a curved-end portion and an opposite, substantially flat-end portion;

the curved-end portion forms a partial sphere adaptable for extending parallel to a beaded-end portion formed on a component or flexible hose inner liner; and the substantially flat-end portion extends substantially parallel to an outer surface of a flexible hose overlapping the beaded-end portion of the component or hose inner liner, whereby the curved-end portion of the retainer ring presses the flexible hose into contact with the flexible hose, thereby pressing the flexible hose into sealing contact with the beaded end portion of the component with a pressure that increases as the pressure of the gas or fluid flowing through the inner liner and the attached component increases.

2. The self-adjusting retainer ring according to claim 1, wherein the ring is characterized as being formed from thermoplastic or metallic materials.

3. An improved flexible hose assembly for transmitting pressurized gas and/or fluid between a pair of components, comprising:

a flexible inner liner having a pair of opposite ends adaptable for engaging the components to form a flow passageway through the inner liner; and a flexible helix surrounding and supporting an outer surface of the flexible inner liner, the helix having an irregularly-shaped outer surface portion and a substantially flat inner surface portion in continuous, bonded contact with substantially the entire outer surface of the inner liner to prevent air gaps from forming between the helix and the outer surface and eliminate the need for an additional reinforcing cord surrounding the helix.

4. The improved flexible hose assembly according to claim 3, wherein the helix is formed of a thermoplastic material.

5. The improved flexible hose assembly according to claim 3, wherein the irregularly-shaped outer surface has a substantially rounded cross-sectional configuration.

6. A self-adjusting clamping assembly for joining and retaining an end portion of a flexible hose and the end portion of a component in predetermined overlapping positions relative to one another wherein one of the end portions includes a beaded-end portion, comprising:

a substantially ring-shaped clamping member having one end portion of partially curved configuration and an opposite end portion of substantially cylindrical configuration;

the substantially cylindrical end portion of the clamping member being adaptable for overlapping an outer surface of the overlapping end portion;

the curved-end portion of the clamping member being of partially spherical configuration and adaptable for covering about one-half (½) of the beaded-end portion when pressing the overlapping end portions together; whereby the partially spherically-shaped end portion presses one overlapping end portion into the beaded end with a pressure that increases as the pressure of the gas or fluid flowing through the inner liner increases.

7. The self-adjusting retainer ring according to claim 6, wherein substantially curved-end portion overlaps substantially one-half (½) of the beaded-end portion when positioned to encircle component and overlapping flexible hose.

8. The self-adjusting retainer ring according to claim 6, wherein the curved-end portion forms substantially one quarter (¼) of a sphere.

9. A method of forming an improved flexible hose assembly capable of transmitting pressurized gases and/or fluids between a pair of components, comprising the steps of:

extruding a length of thermoplastic material to form a flexible helix having a outer surface portion with an irregular cross-section and an inner surface portion of substantially cylindrical cross-section;

positioning the helix to enclose a flexible inner liner of substantially cylindrical configuration so that the inner surface portion of the helix contacts substantially the entire outer surface of the inner liner; and;

bonding the contracting surfaces of the inner liner and helix to one another.

\* \* \* \* \*